(12) United States Patent
Hubbell, Jr.

(10) Patent No.: US 6,367,526 B1
(45) Date of Patent: Apr. 9, 2002

(54) RADIAL PNEUMATIC LIGHT TRUCK OR AUTOMOBILE TIRE

(75) Inventor: David Ray Hubbell, Jr., Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/485,182

(22) PCT Filed: Oct. 30, 1997

(86) PCT No.: PCT/US97/19740

§ 371 Date: Feb. 3, 2000

§ 102(e) Date: Feb. 3, 2000

(87) PCT Pub. No.: WO99/22952

PCT Pub. Date: May 14, 1999

(51) Int. Cl.$^7$ ................................................ B60C 11/00
(52) U.S. Cl. .................... 152/209.1; 152/454; 152/525; 152/539
(58) Field of Search ................................. 152/454, 458, 152/517, 209.1, 209.13, 209.14, 212, 527, 531, 556, 540, 547, 548

(56) References Cited

U.S. PATENT DOCUMENTS

| 4,328,850 | A | * | 5/1982 | Uemura | 152/209 |
|---|---|---|---|---|---|
| 4,669,519 | A | | 6/1987 | Togashi et al. | 152/454 |
| 4,770,221 | A | | 9/1988 | Matsumoto | 152/554 |
| 4,785,861 | A | | 11/1988 | Fujiwara | 152/209 R |
| 4,867,218 | A | | 9/1989 | Asano et al. | 152/454 |
| 5,394,915 | A | | 3/1995 | Takada | 152/209 R |
| 5,458,173 | A | | 10/1995 | Yamashita | 152/209 R |
| 5,630,893 | A | | 5/1997 | Williams et al. | 152/209 R |
| 5,637,162 | A | | 6/1997 | Rhyne et al. | 152/454 |
| 5,871,600 | A | * | 2/1999 | Oare et al. | 152/458 |
| 5,871,602 | A | * | 2/1999 | Paonessa et al. | 152/517 |
| 5,879,482 | A | * | 3/1999 | Rooney et al. | 152/209 |
| 6,070,633 | A | * | 6/2000 | Rooney et al. | 152/540 |
| 6,082,423 | A | * | 7/2000 | Roesgen et al. | 152/209 |
| 6,135,181 | A | * | 10/2000 | Paonessa et al. | 152/458 |

FOREIGN PATENT DOCUMENTS

| EP | 0 812 708 A1 | 12/1997 | B60C/11/00 |
|---|---|---|---|
| GB | 2 224 703 A | 5/1990 | B60C/09/00 |

* cited by examiner

Primary Examiner—Edward J. Cain
Assistant Examiner—Katarzyna W. Lee
(74) Attorney, Agent, or Firm—David L King

(57) ABSTRACT

A radial ply pneumatic tire 30 has a unique cross sectional profile. The tires rum flange width W is greater than the tread width TW and the maximum section width SW is located radially less than 50% of the section height SH as measured from the nominal rim diameter ND.

6 Claims, 4 Drawing Sheets

RADIAL PNEUMATIC LIGHT TRUCK OR AUTOMOBILE TIRE

TECHNICAL FIELD

This invention relates to a radial ply pneumatic tire, more specifically to an improved cross section profile for such tires.

BACKGROUND ART

Subtle changes in the molded shape of a pneumatic radial tire, the materials used to make the tire, the design of the tread pattern or the belt package or the reinforcing members can improve or detract from the performance of the tire. The tire designer is under constant pressure to improve the overall performance of the tire. In his pursuit of improving the product, he often must reverse or abandon the previously conceived design approaches and start anew with previously considered unworkable designs or approaches which when creatively applied in a new way solve problems or achieve performance goals heretofore believed unachievable.

Pneumatic tires are one of the most complex laminated composite structures devised by man. They are inherently difficult to correctly model and are routinely simplified in analysis leading to clearly erroneous design theories and approaches.

The very nature of the tire makes it possible for many conflicting design approaches to survive and even flourish because the structure is so complex that multiple variables are constantly being adjusted to optimize a particular design theory.

One particularly important variable that influences a tires performance is its molded shape and its resultant cross sectional profile when the tire is mounted and inflated on its design rim.

Rhyne et al in U.S. Pat. No. 5,637,162 assigned to Michelin teaches a tire structure for Improved Tread Life that claims a particular carcass and belt profile when the tire is properly inflated. The profile has a smaller than normal outside diameter combined with a larger cross-sectional width which enables a tread to have a flatter wider tread arc width which reduced the contact pressure across the tread profile. The resultant profile enables the tread life to achieve about 100,000 miles of service. Its tread width as taught extends axially outwardly of the mounted bead width.

An earlier U.S. Pat. No. 4,669,519 issued Jun. 1, 1987 to Tagaski et al, teaches a Reduced Rolling Resistance Pneumatic Radial Tire which has a molded lower sidewall and bead area that is 20%–50% wider than its design rim width. The tires profile is such that the maximum section width is located radially in the upper sidewall region or greater than 50% of the tires section height as measured from the nominal rim diameter. The conventional radial tire has the maximum section width located at a radial height about 50% of the section height. This Bridgestone Patent teaches that the hysterectic shear stresses in the shoulder region of the sidewall generates the most losses in terms of rolling resistance and that by minimizing these losses a benefit in reduced rolling resistance can be achieved because the tread shoulders will run cooler.

Both of these diverging solutions are plausibly correct. That is the beauty of the tire art. The engineers can practice what appears to be contradicting approaches to get to a similar improved result. It is for that reason that so many patents are issued. The unexpected results abound. Those of ordinary skill in the tire art routinely teach away from particular ideas, which are latter, discovered to provide beneficial solutions.

The prior art Patent No. GB-A-2 224703 assigned to Sumitomo Rubber Ind., Ltd. is regarded as the most relevant prior art and it teaches the features found in the preamble of claim 1; wherein the maximum section width of the tire is greater than the rim flange width and the tread width is less than the rim flange width.

The subject matter of the present invention teaches a novel tire profile that appears to be contrary to both of the above prior art patents and another departure from the conventional wisdom of those of ordinary skill in the art.

An object of the present invention is to provide a tire profile that minimized the rolling resistance of tire while minimizing the effect of the tread compound selection. In other words desensitizing the tires rolling resistance performance as a function of tread compounding.

Another object of the invention is to provide a lightweight tire.

Another object of the invention is to improve treadwear service mileage.

These and other objectives have been demonstrated by the tire as described here below.

SUMMARY OF THE INVENTION

A radial ply pneumatic tire is disclosed. The tire 30 has a maximum section width SW, a maximum section height SH, the ratio of SH/SW defining the tire aspect ratio, the aspect ratio being 85% or less. The tire has a nominal rim diameter ND, a nominal rim flange width W, and a tread having a tread width, TW.

The tire 30 has the maximum section width SW being located within a radial distance X from the nominal rim diameter ND, the distance X being less than a 50% of the maximum section height SH and wherein the maximum section width SW is greater than the rim flange width W and the tread width TW is less than the rim flange width W.

Preferably the distance X is about 40% of the maximum section height SH. The maximum section width SW is preferably at least 10% greater than the nominal rim flange width W and the tread width is preferably a least 10% less than de nominal rim flange width W.

The tire 30 his a carcass structure 36 having one or more radial ply, the ply or plies extended to and at least one ply is wrapped about or otherwise attached to a pair of annular bead cores 35. The radial plies are reinforced by parallel cords 20. The tire 30 when mounted on its design rim 40 and inflated has the cords 20 placed in tension. At a location between the radial location of the maximum section width SW and the nominal rim diameter ND a line $L_1$, drawn through a point Y, the point Y intersecting the bead at the location of the nominal rim diameter ND, and tangent to the sidewall 21 is inclined radially and axially inwardly at an angle θ relative to the rim flange, θ being less than 40° in each sidewall 21.

The tire 30 has its sidewall 21, at a radial location Z between the location of the maximum section width SW and the radially outmost section height location SH, inclined such that a line $L_2$ drawn through Z and tangent to the sidewall 21 radially inwardly and axially outwardly is inclined at an angle β, relative to a plane perpendicular to the tires aids, θ being 90% of β or greater in each sidewall 21. Preferably θ is about equal to β, most preferably in the range of 90–120% of β.

The locations Y and Z he on an axis A passing through the centroid C of the sidewall, the axis A being perpendicular to the tire axis of rotation. The centroid C of each sidewall is defined by the area within the sidewall 21 and between a line 70 drawn through a tread edge 30A or 30B and a tangent to the axially inner portion of the bead area 33 at location 12.

Definitions

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes toe guards and chafers, to fit the design rim.

"Belt structure" or "Reinforcing Belts" means at least two annular layers or plies of parallel cords, woven or unwove, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Design rim" means a rim having a specified configuration and width. For the purposes of this specification, the design rim and design rim widths are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same is the standard measurement rims. In Japan, the standard organization is The Japan Automobile Tire Manufacturer's Association.

"Design rim width" means the specified distance axially between rim flanges. For the purpose of this specification, the design rim width (D) is taken as (the minimum recommended rim width plus the maximum recommended rim width)/2 as specified by the appropriate industry standards.

"Equatorial plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Normal inflation pressure" refers to the specific design inflation pressure and load assigned by the appropriate standards organization for the service condition for the tire.

"Normal load" refers to the specific design, inflation pressure and load assigned by the appropriate standards organization for the service condition for the tire.

"Ply" means a continuous layer of rubber-coated parallel cords,

"Radial" and "radially" means directions radially toward or away from the axis of rotation of the tire.

"Radial-ply tire" means a belted or circumferentially-restricted pneumatic fix in which the ply cords, which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded excluding elevations of the sidewalls due to labeling, decoration or protective bands.

"Sharp diameter" means the diameter as measured radially across the tire through the axis to the points defined by the intersection of a fine extending tangent the bead seat or first surface and a line extending tangent the bead flange or second surface.

"Shoulder" means the upper portion of a sidewall just below the tread edge. Affects cornering.

"Sidewall" means that portion of a the between the tread and the bead.

"Tread width," means the arc length of the tread surface in the axial direction, that is, in a plane passing through the axis of rotation of the tire.

DETAILED DESCRIPTION OF THE DRAWINGS

DETAILED DESCRIPTION OF THE INVENTION

Figure 1:
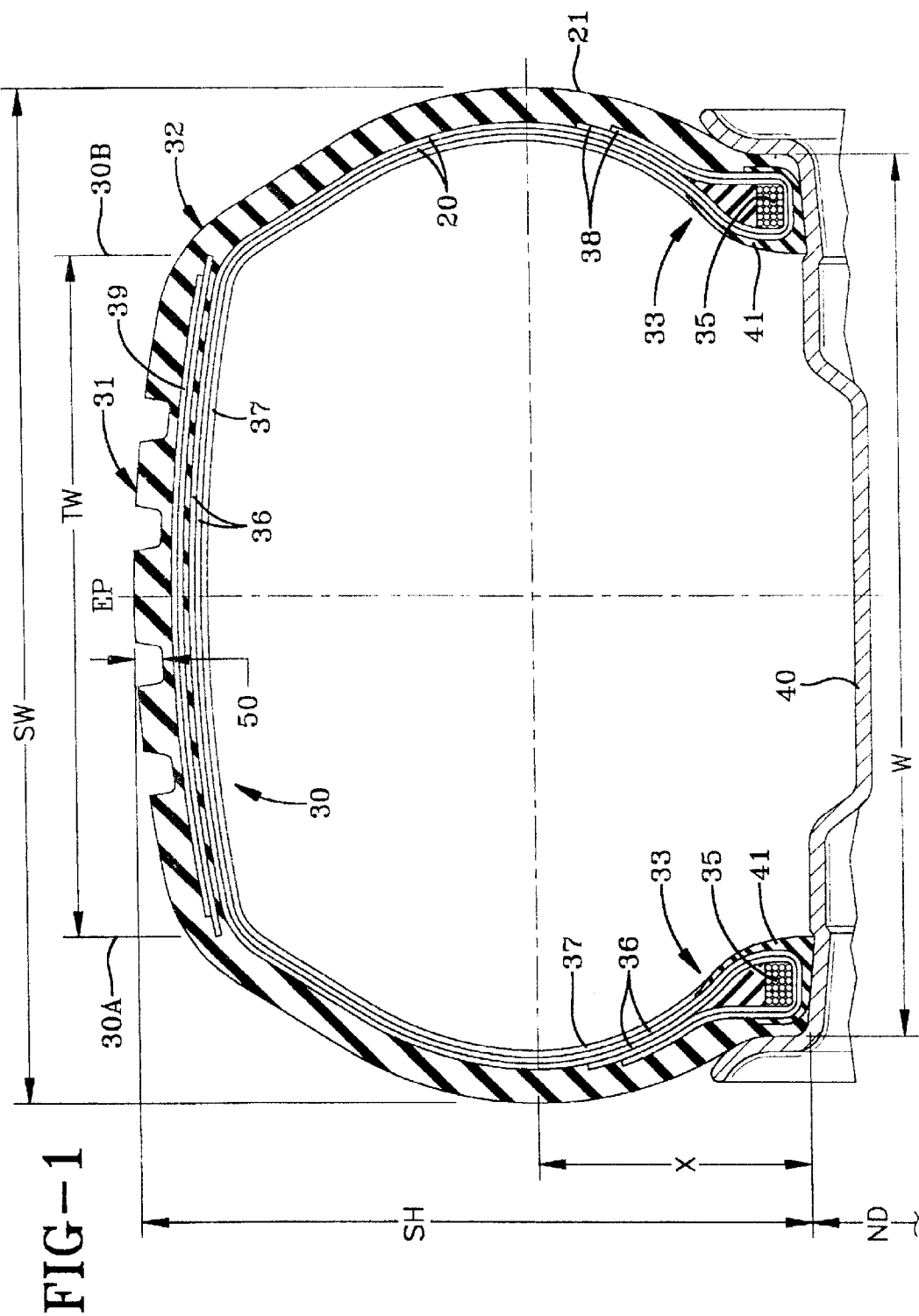
FIG. 1 is a cross sectional view of the tire according to a preferred embodiment of the invention as shown mounted on its design rim.

Referring to FIG. 1, there is illustrated a cross sectional view of a tire 30 made in accordance with the present invention. In the particular illustrated embodiment, the tire 30 is a low aspect ratio passenger tire. As shown, the beads 33 are spaced axially a distance (W) equal to the specified design rim width D.

The tire 30 is provided with a ground-engaging tread portion 31, which terminates in the shoulder portions 32 at the lateral edges 30A and 30B of the tread 31. Radially outer sidewall portion 21 extends from shoulder portion 32 and terminates in the bead portion 33, the bead portion having an annular inextensible annular tensile member or bead cores 35. The tire 30 is further provided with a carcass reinforcing structure 36 having one or more radial plies which extends from the tensile member 35 through the sidewall portion 21, the tread portion 31, the opposite sidewall portion 21 down to the opposite tensile member 35. At least one pair of turnup ends 38 of the carcass reinforcing structure 36 are preferably wrapped about the tensile members 35. As illustrated, the bead portion 33 has a chipper 41 wrapped about the reinforcing member 36 and tensile member 35. The tire 30 may include a conventional innerliner 37 forming the inner peripheral surface of the tire 30 if the tire is to be of the tubeless type.

Placed circumferentially about the radially outer surface of the carcass reinforcing structure 36, beneath the tread portion 31, is a tread reinforcing belt structure 39. In a preferred embodiment, the belt structure 39 comprises two single cut belt plies and the cords of the belt plies are oriented at an angle ranging between 17° and 25° with respect to the equatorial plane of the tire. The cords of one belt ply are disposed in an opposite direction to the equatorial plane and from that of the cords of the other belt ply. However, the belt structure 39 may comprise any number of belt plies of any desired configuration and the cords may be disposed at any desired angle.

The carcass reinforcing structure 36 includes at least one reinforcing ply structure comprising each one layer of parallel cords 20. The cords 20 of the reinforcing ply structure 36 are oriented at an angle of at least 75° with respect to the equatorial plane EP of the tire 30. The cords 20 reinforcing the carcass ply 36 may be of any material normally used for cord reinforcement of rubber articles, for example, and not by way of limitation, rayon, nylon, steel and polyester. The reinforcing ply structure 36 has turnup ends 38, which wrap about the bead core 35, the ends being located at about 20% to 50% of the section height of the tire 30.

Before mounting the tire 30 on a rim 40 and inflating the tire 30 has the shape imparted to it by the mold. After mounting the tire 30 on the rim 40, the inclination of the bead portions 33 of the tire 30 is imposed by the rim 40.

The bead 33 has a first annular surface 23 located between the bead toe 22A and the bead heel 22B. The first annular surface is preferable inclined at an angle when the beads 33 are spaced a distance W. The distance W is equal to the design rim width D. For the purpose of this specification, the design rim width (D) is the average of the specified maximum and minimum design rim widths, the widths being measured axially between the rim flanges. The range of design rim widths is established by the industry standards applicable where the tire is made. In the United States, for example, the Tire and Rim Association standards have established a range of recommended rim widths for "J" type rim in the 14" to 16" rim diameter size, the range of widths for a 225/55R16 tire being 6.5 to 8.0 inches. The design rim width D as defined in the application, therefore, is 7.25 inches for the 225/55R16 tire. A tire molded at a different bead width naturally may have different bead surface orientations. However, when the beads are spaced a distance W as so defined, the orientation of the surfaces must fall within the range to achieve the benefits of the present invention.

Illustrated in FIG. 1 is a cross-sectional view of the tire 30 of the present invention. As shown the tire is mounted on its design rim 40 and is inflated but not loaded.

Figure 4:
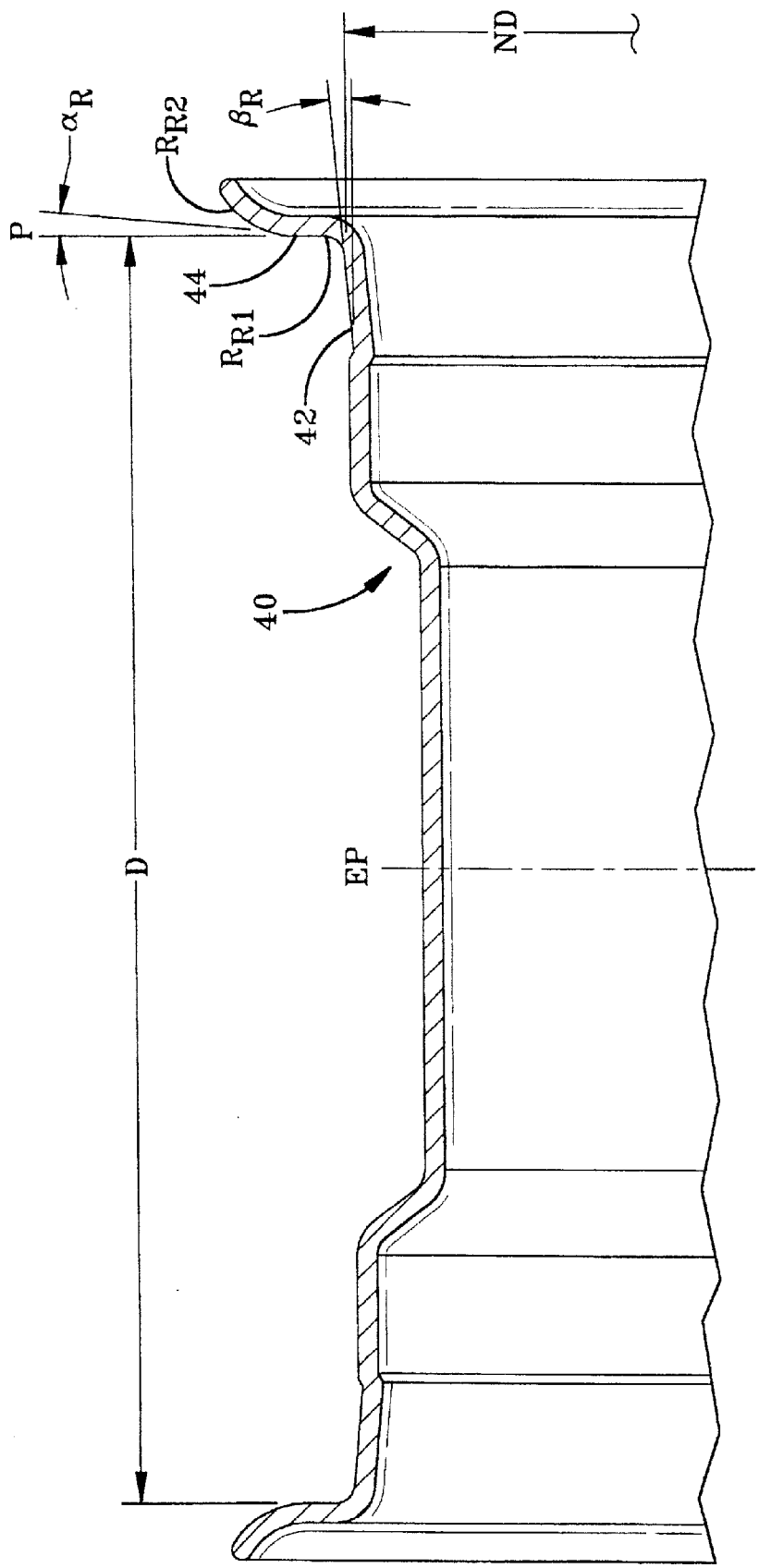
FIG. 4 is a cross sectional view of a standard design rim.

Each tire 30 has a specific recommended design rim 40 for each particular tire size. The design rim 40 as shown in FIG. 4 has a pair of annular rim flanges 44 therein flanges restrain the axially growth of the bead area of the tire 30. The axial distance between the flanges defines the rim width D. The bead seats 42 of the rim 40 are set at a slight taper $B_R$ for passenger tires usually a 5° taper. The intersectional of the rim flange 44 and the bead seat 42 of the of the design rim 40 define the tire nominal rim diameter ND. The rim flange 44 is inclined at an angle $\alpha_R$ generally 0° to 2° off vertical. The flange has an outer radius $R_{R2}$ and an inner radius $R_{R1}$ as shown.

The tire 30 as shown in FIG. 1 has a maximum section width SW, a maximum section height SH, the ratio SH/SW defines the tire aspect ratio. This inventive tire has an aspect ratio, of 85% less. The tire 30 has a nominal rim diameter ND, a nominal rim flange width W and a tread 31 having a tread width TW.

As shown the maximum section width SW is located width a radial distance X from the nominal rim diameter ND. The distance X is less than 50% of the maximum section height SH, preferably the location X is about 40% or less. The maximum section width SW is preferably at least 10% greater than the rim width W and the tread TW width is at least 10% less than the nominal rim flange width.

The above relationship of section height, section width, rim flange width are all established when the tire is inflated and mounted on its design rim, but unloaded. As previously stated, the tire 30 of the presented invention is preferably molded at a different bead width. The recommended molded bead width is preferably about 1 inch (2.5 cm) greater than the design rim width D of about 7.25 inches (18.4 cm) for the exemplary 225/55R16 tire size or generally about 15% greater than the design rim width.

Thus when the tire 30 is mounted to its design rim 40 the beads 33 are moved closer together than the tires molded bead width. This causes the ply cords 20 to be slightly pre-loaded or tensioned. This is believed to enhance the responsiveness of the tire 30 in terms of handling performance.

This is particularly significant because the inflated tires profile is a radical departure from the radial ply tires of the prior art.

The tire 30 has a relatively flat tread 31 with the entire tread lying between and axially narrower than the tires design rim width D, the tread width TW being measured between the tires lateral edges 30A, 30B. This narrowing of tread width TW commonly is considered to decrease tread mileage. This need not be the case, however, because the unique tire profile actually increases the tread unit pressure slightly because of the reduced footprint area. This increased pressure is particularly beneficial to the tread 31 adjacent the shoulder region 32 of the tire 30. This in turn enables the tread 31 to wear more uniformly and accordingly lasts longer.

The inventors found that the tire profile can permit a shallower non-skid depth 50 of the tread 30 to be used. This also reduces hysterisis effects. Furthermore, because the tread shoulder regions 32, which is normally prone to high beat build-up, is narrowed further gains in rolling resistance reductions can be achieved. All of these beneficial factors mean that the tire engineer can use tread compounds that wear better and have good traction properties without the normally associated loss in rolling resistance performance.

Figure 2:
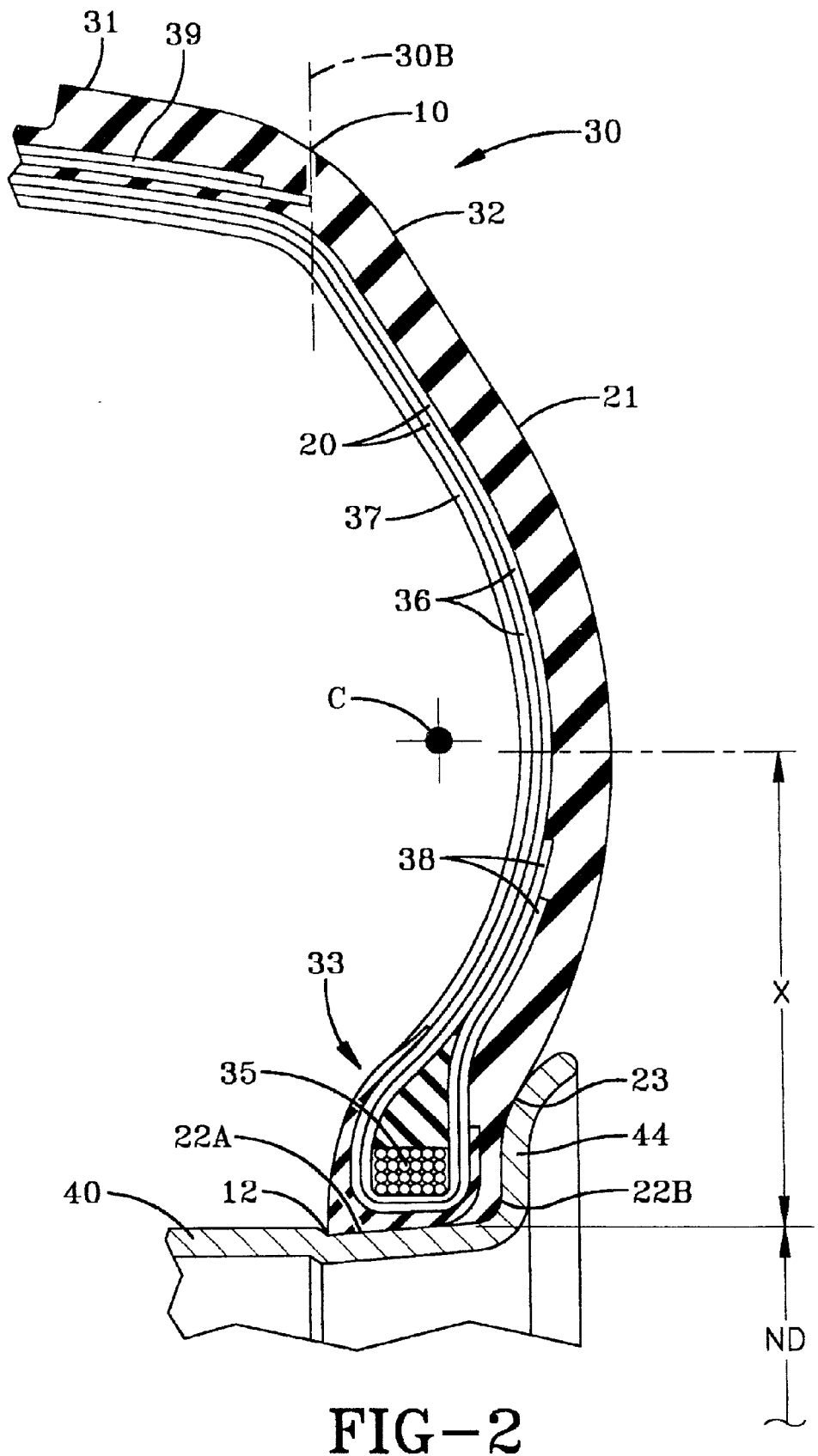
FIG. 2 is an enlarged view of a sidewall portion of the tire of FIG. 1.

The tire 30 as further shown in FIG. 2 has a unique sidewall profile. The curvature is such that the sidewall 21 acts like a curved beam between the lateral tread edge 30A or 30B at location 10 and the axially inner surface of the ply adjacent the bead core at location 12.

Figure 3:
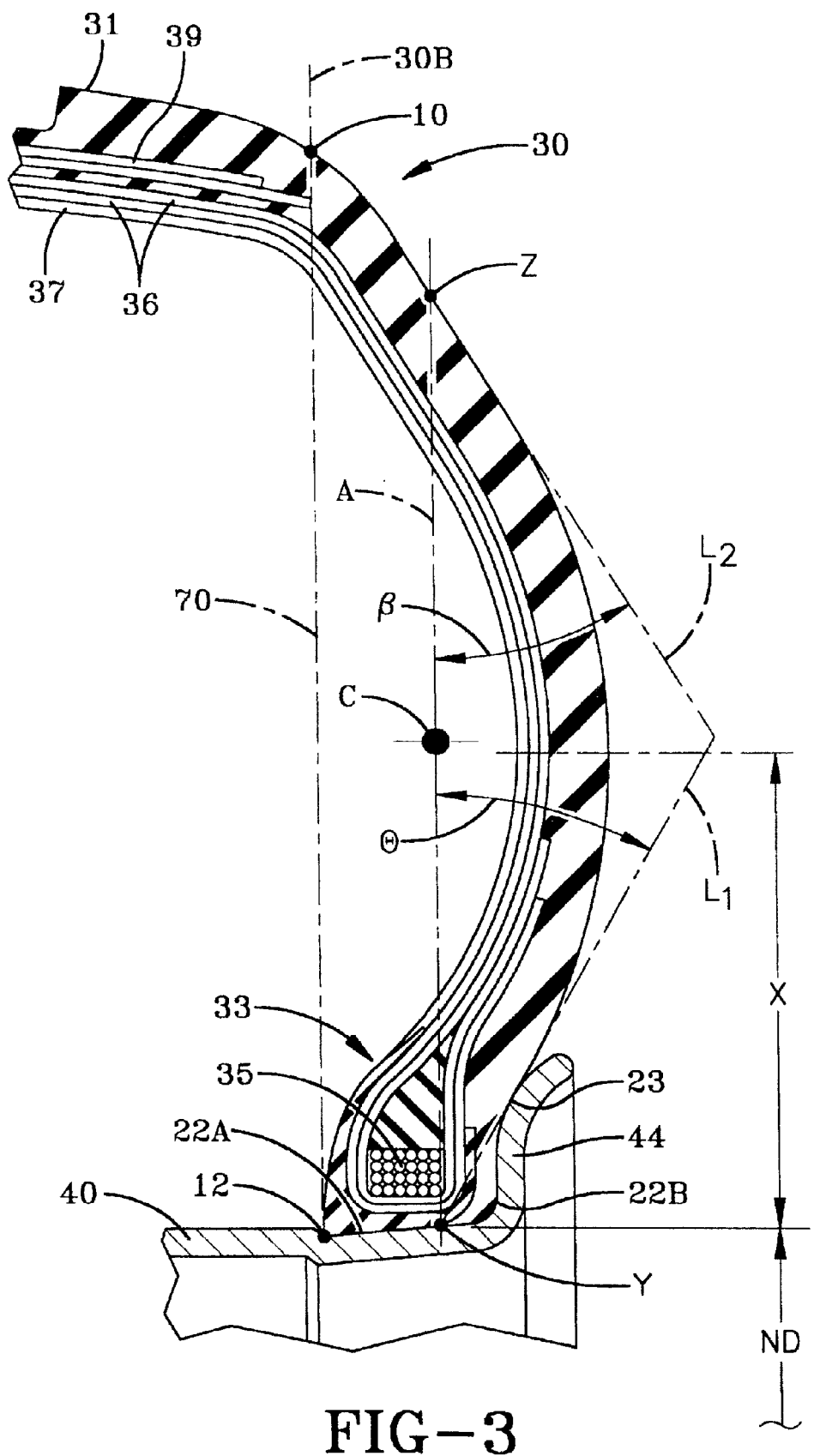
FIG. 3 is a schematic representation of the sidewall profile of FIG. 2.

If one uses the inflated but unloaded sidewall path and a straight line 70 drawn through points 10 and 12 a schematic representation of the profile arm can be shown as in FIG. 3. Mathematically the centroid of this area can be located as a point in space indicated as C. Normally the location C would be located at a radial location of 50% of the section height SH as measured from the nominal rim diameter ND. The tire 30 of the present invention has the centroid C well below 50% of the section height SH, similarly the radial location of the maximum section width SW is below the 50% location of the section height SH.

If one draws a major axis A through this location C, the radially outer intersection of the axis A and the sidewall 21 is located at a Z, and the radially inner intersection is located at Y. A line $L_1$ drawn intersecting Y and tangent to the sidewall is inclined radially and axially outwardly at an angle θ relative to the centroid major axis A.

Complementing this, angular relationship the tangent line $L_2$ at location Z is inclined at an angle β relative to the axis A, β being less than 40° in each sidewall. The angle θ is 90% of β or greater in each sidewall 21.

A test tire in a size P225/70R16 was evaluated using the above described profile and were compared against a production prior art Eagle LS tire of a similar size. Although not mandatory, the lateral extremes of the belt reinforcing structure 39 should be located in close proximity to the line 70 which passes through location 10 and 12. The test tire 30 had an angle of θ of 32°, an angle β of 30° when mounted on a rim having a 6.5 inches design rim flange width D, and a tread width TW of 5.9 inches. The maximum section height SH was 5.75 inches and the radial location X of maximum section width SW was 2.55 inches as measured from the nominal rim diameter. The ratio of X/SH was 40.7%. The ratio of C/SH was slightly more at 41.7%. The control tire had the tread width TW being 7.0 inches which is wider than the rim flange width, the angle β was 22°, while θ was 36° using the mine size rim 40, with X being 43%. The belt structure 39 location of the lateral extremes of the inventive tire 30 can be on either side of the line 70, preferably on line 70. The test tire has improved ride and handling, a slightly better wet handling performance compared to the control tire. Most significantly, a greater than 1 Kg. reduction in weight was achieved compared to the control tire.

Similar improvements were noted in a tire size P185/70R14. The results, of this testing confirmed that a lighter weight lower cost tire could be made using the novel profile while at the same time improving the tires overall performance.

An alternative method of approximating the upper and lower sidewall angles θ and β is to take a tangency to the sidewall 21 of the tire 30 at a radial location of 75% SH and 25% SH, at these two locations the angles θ and β are approximately the same as if measured as suggested at the locations, as defined previously.

What is claimed is:

1. A radial ply passenger or light truck pneumatic the having an axis of rotation, a maximum section width SW, a maximum section height SH, the maximum section height SH/the maximum section width SW defines the tires aspect ratio, the aspect ratio being 85% or less, a nominal rim diameter ND, a nominal rim flange width W, and a tread having a pair of tread edges defining a tread width TW, the maximum section width SW being located at a radial distance X from the nominal rim diameter ND, the distance X being less than 50% of the maximum section height SH and wherein the maximum section width SW is greater than the rim flange width W and the tread width TW is less than the rim flange width W, a pair of sidewalls, each sidewall having a centroid C, the centroid C being defined by the area within the sidewall and between a line drawn through a first or second tread edge and tangent to an axially inner portion of a bead adjacent to a bead core, the centroid C having a major axis A perpendicular to the tires axis of rotation, the intersections of the axis A being Y at a radially inner intersection and Z at a radially outer intersection, the intersection Z of the axis A and the tire occurs at the sidewall characterized in that the intersection Y of the axis A and the tire occurs in the bead portion at the location of the nominal rim diameter ND; whereby the centroid C is located at a radial location greater than the radial location X of the maximum section width SW but less than 50% of the section height SH.

2. The tire of claim 1 wherein the distance X is 40% or less of the maximum section height SH.

3. The tire of claim 1 wherein the maximum section width SW is at least 10% greater than the rim flange width W.

4. The tire of claim 1 wherein the maximum tread width TW is at least 10% less than the rim width W.

5. The tire of claim 1 further characterized by one or more radial ply, the radial ply or plies extending to a pair of annular bead cores at least one ply being wrapped about or otherwise attached to the bead cores, the radial plies being reinforced by cords, the tire when mounted on a design rim and inflated and unloaded has the cords placed in tension, and at the location Y, a line $L_1$ drawn intersecting Y and tangent to the sidewall is inclined radially and axially outwardly at an acute angle θ relative to the major axis A, θ being less than 40° in each sidewall.

6. The tire of claim 5 wherein the sidewall at a radial location Z midway between the location of the maximum section width SW and the radially outermost section height location SH, a line $L_2$ drawn intersection Z and tangent to the sidewall is inclined at an angle β radially inwardly and axially outwardly relative to the axis A, θ being 90% of β or greater in each sidewall.

\* \* \* \* \*